United States Patent            [15]  3,668,822
Mannion et al.                     [45] June 13, 1972

[54] FLOW RESISTANCE EQUALIZER FOR LIQUID CIRCULATION SYSTEM

[72] Inventors: Gerald F. Mannion, 608 Bowlingreen Court, Naperville, Ill. 60540; James R. Mannion, 10336 South Kolmar, Oak Lawn, Ill. 60453

[22] Filed: Nov. 16, 1970

[21] Appl. No.: 89,848

[52] U.S. Cl. .................................. 55/159, 138/40, 138/42, 237/63
[51] Int. Cl. ...................................................... B01d 19/00
[58] Field of Search ................... 55/41, 52, 159, 36; 138/40, 138/42; 210/188, 308, 312, 436, 472; 237/56, 59, 63

[56] References Cited

UNITED STATES PATENTS

| | | | |
|---|---|---|---|
| 1,726,328 | 8/1929 | Wieand | 138/41 X |
| 2,375,646 | 5/1945 | Grossi | 138/41 X |
| 2,667,186 | 1/1954 | St. Clair | 138/42 |
| 2,764,356 | 9/1956 | Jay et al. | 237/56 |
| 3,311,131 | 3/1967 | Zahuranec | 138/44 |

Primary Examiner—Reuben Friedman
Assistant Examiner—R. W. Burks
Attorney—Kinzer, Dorn & Zickert

[57] ABSTRACT

A flow equalization fitting for balancing a water circulation system by equalizing the flow resistances of a number of water utilization devices in the system, comprising a replaceable orifice member mounted in the outlet of the fitting, a strainer and trap located in the fitting ahead of the orifice, with a clean-out for the trap, and a vented air chamber for trapping entrained air released ahead of the orifice.

7 Claims, 4 Drawing Figures

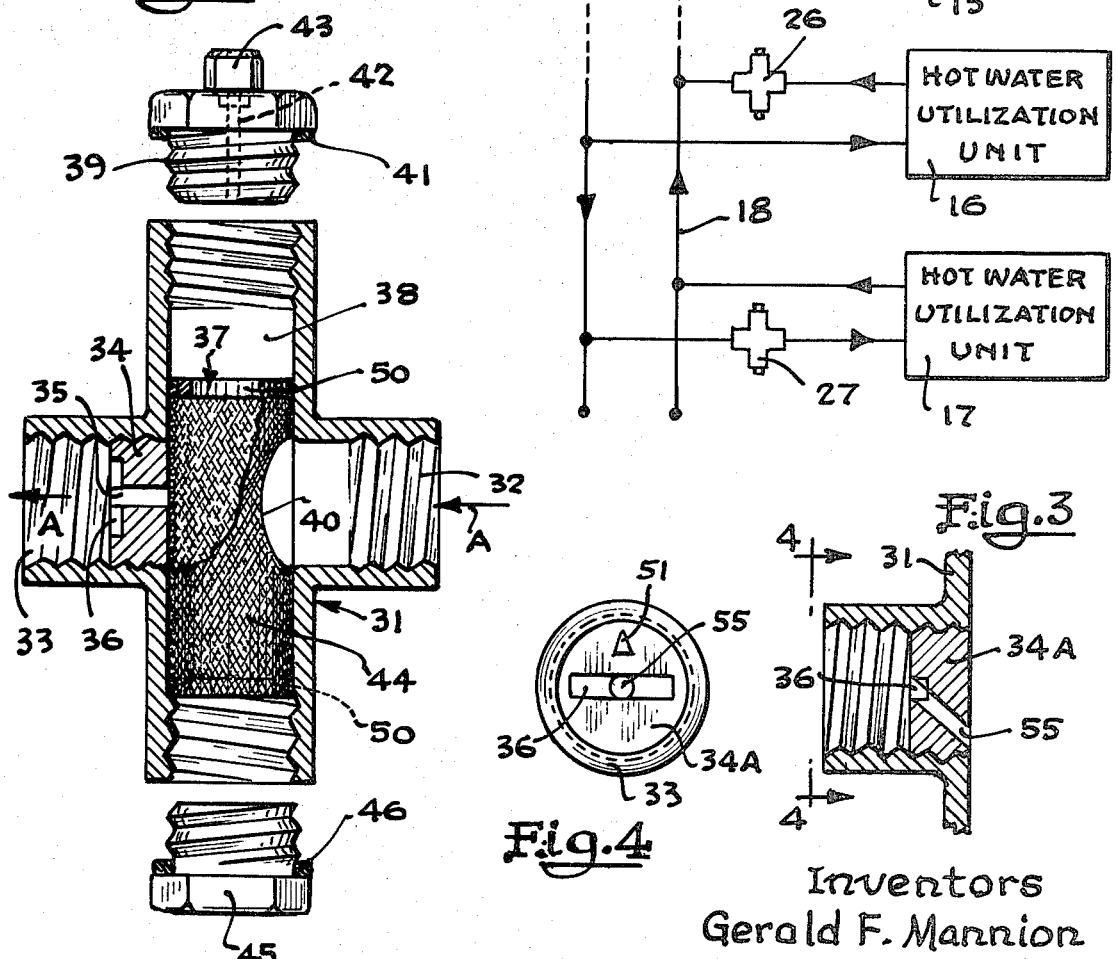

FLOW RESISTANCE EQUALIZER FOR LIQUID CIRCULATION SYSTEM

BACKGROUND OF THE INVENTION

There are a wide variety of different applications in which water must be distributed from a central location to a large number of utilization devices. A typical example is the heating plant for a large building or a multiple-building complex, in which hot water is distributed for heating purposes and often for some processing purposes to a large number of radiators, convection heaters, process installations, and other utilization units often having very different flow requirements and flow resistances. The problem of maintaining adequate and effective flow to all devices in a system of this kind is often quite difficult. The problem becomes more complicated when, as often occurs, the system is modified at some point to provide for additional equipment or even to add an entire new building. An even more complex situation is presented when there are parallel distribution systems for hot water and for chilled water, particularly since many of the utilization devices may require hot or cold water for effective operation at different times.

The usual approach to balancing of a large building or multiple-building water distribution system, served from a centralized location, entails the use of a balancing or throttling valve at each utilization device, sometimes with additional balancing valves at different sections of the overall system. Where the flow demands of the utilization devices exhibit substantial variations, however, as is frequently the case, effective adjustment of the balancing valves to assure an adequate flow in all parts of the system is quite difficult and sometimes virtually impossible.

The most reliable and effective way to assure an adequate water flow throughout an entire system, so that devices having the greatest flow requirements and the least flow requirements always receive adequate water, regardless of their location relative to the water supply, is to equalize the flow resistances of all of the various coils and other units connected to the system, compensating for any variations in the inherent resistances of different units. Balancing valves, functioning essentially as throttling devices, are not well suited to this purpose and are often unduly expensive. The basic need is for a simple flow resistance equalizer fitting, inexpensive enough to be employed on a one-for-one basis for each coil or other utilization device in the system, and adaptable to incorporation in new systems or in existing installations.

The same problems and difficulties can occur in distribution systems for liquids other than water. In this specification references to water distribution systems are intended to include systems utilizing other incompressible fluids.

SUMMARY OF THE INVENTION

It is a principal object of the present invention, therefore, to provide a new and improved flow resistance equalization device for a liquid circulation system comprising a multiplicity of liquid utilization units individually connected between a supply line and a return line that can be effectively employed to equalize the flow resistances of all of the utilization units.

A further object of the invention is to provide a simple and inexpensive flow resistance equalization device for complex water and other liquid distribution systems that is inherently self-protecting with respect to solid particles entrained in the liquid.

A further object of the invention is to provide a new and improved flow resistance equalization device for use in complex water circulation systems that is inherently self-protecting with respect to the release of air that may be entrained in the water.

A particular object of the invention is to provide a new and improved water circulation system that incorporates a plurality of flow resistance equalization devices, one for each water utilization unit in the system, that includes orifices of different sizes, correlated with the inherent flow resistance characteristics of the utilization units with which the devices are associated to afford equalized resistance at each utilization unit.

Accordingly, the invention relates to a flow resistance equalization device employed in a water or other liquid circulation system of the kind comprising a plurality of liquid utilization units each individually connected between a supply line and a return line and having flow resistance characteristics that vary substantially from one utilization unit to another. Each flow resistance equalization device comprises a fitting having an inlet and an outlet adapted for connection between one of the supply and return lines and one of the individual utilization units. A replaceable orifice member is removably mounted in the outlet of the fitting, interposing an orifice having a limiting flow resistance in series with the utilization unit. A porous barrier is mounted within the fitting between the inlet and the orifice member and is employed to screen out solid particles entrained in water flowing through the fitting, thereby preventing clogging of the orifice. An air chamber is located within the fitting ahead of the orifice to collect entrained air released from the liquid as the liquid velocity is reduced ahead of the orifice, and vent means are provided for venting the air chamber.

BRIEF DESCRIPTION OF THE DRAWINGS

FIG. 1 is a schematic diagram of a water distribution system constructed in accordance with the invention and utilizing a plurality of individual flow resistance equalization devices constructed in accordance with the invention;

FIG. 2 is a sectional elevation view, partially disassembled, of a flow equalization device constructed in accordance with one embodiment of the invention;

FIG. 3 is a detail view of a modification of the device of FIG. 2; and

FIG. 4 is a detail view taken approximately along line 4—4 in FIG. 2.

BRIEF DESCRIPTION OF THE PREFERRED EMBODIMENTS

FIG. 1 illustrates, in simplified schematic form, a water circulation system 10 constructed in accordance with the present invention and utilizing a series of flow resistance equalizers constructed in accordance with the invention. System 10 comprises a hot water supply 11 which may include a conventional boiler or other heat exchanger. Alternatively, supply 11 could comprise a plurality of chillers to afford a chilled water supply, or might constitute a source of some process liquid other than water.

A pump 12 is connected to the outlet of water supply 11 and pumps water from supply 11 into a supply line 13. A series of individual water utilization units 14, 15, 16 and 17 are incorporated in system 10, each having an inlet connected to supply line 13 and each having an outlet connected to a return line 18 for conveying the used water back to supply 11. The utilization units 14–17 may comprise individual radiators, heating coils, and other conventional devices requiring a supply of heated (or chilled) water for effective operation. The flow resistance characteristics of the utilization units 14–17 may be substantially different from each other. It should be understood that, although only four utilization units are shown, the actual number of such units in system 10 may be very much larger and may total in the hundreds or even thousands.

A flow resistance equalization device 24 is connected in the return circuit for the initial hot water utilization unit 14, between the outlet port of unit 14 and the return line 18. A similar flow resistance equalization unit 25 is interposed in the water return circuit for the coil or other utilization unit 15. A flow resistance equalizer 26 is connected in the return for utilization unit 16, between the outlet port of the utilization unit and return line 18. Yet another flow resistance equalizer 27 is connected to the water utilization unit 17, being interposed in the inlet connection to unit 17 between supply line 13 and the inlet port of the utilization unit. It is thus seen that the number of flow resistance equalization devices 24–27 corresponds to the number of utilization units 14–17, with each flow resistance equalizer being interposed between either the inlet port of the utilization device and the supply line 13 or between the outlet port of the utilization device and return line 18.

Each of the equalization devices 24–27 includes a replaceable orifice member. The orifice sizes are selected to afford approximately equal flow resistances at each of the utilization units 14–17, despite substantial variations in the inherent flow resistance characteristics of the utilization units themselves. This affords an effectively balanced system that assures an adequate flow to the utilization device 17 located at the greatest distance from the water supply 11 as well as at the utilization unit 14 positioned most closely adjacent to the water supply.

The preferred construction for the flow-resistance equalization 24–27 is exemplified by the device 24 illustrated in FIG. 2. As shown therein, device 24 comprises a fitting 31 of cross-shaped configuration having a tapped inlet 32 located opposite a tapped outlet 33 and adapted for in-line connection in either the inlet circuit or the outlet circuit of one of the hot water utilization units 14–17 (FIG. 1). The direction of water flow through the fitting is indicated by the arrows A. A replaceable orifice member comprising a plug 34 is removably mounted in the outlet 33 of fitting 31. Plug 34 is threaded into the outlet 33 and includes a limiting orifice 35 that effectively establishes a limiting flow resistance between the inlet 32 and the outlet 33 of equalization device 24. The orifice member, plug 34, may be provided with a slot 36 to engage a large screwdriver or like tool to facilitate insertion and removal of the orifice member from the fitting outlet 33.

A porous barrier 37 is mounted within fitting 31 between the inlet 32 and the orifice member 34. The porous barrier 37, preferably constructed from a fine-mesh corrosion-resistant metal screen, effectively screens out any entrained solid particles in the water that flows through the fitting 31. Thus, barrier 37 effectively prevents clogging of orifice 35. Barrier 37 is preferably constructed as a cylinder of fine-mesh screen, cut away as indicated at 40 to prevent collection of sediment in inlet 32. The screen is mounted on a pair of rings 50 that support the screen and maintain it in spaced relation to the internal fitting walls.

At the top of the cross-shaped fitting 31 there is an internal air chamber 38. The air chamber 38 is closed by a plug 39 that is threaded into the top end of fitting 31 and preferably sealed by a gasket 41. A small vent opening 42 extends through plug 39 and is normally maintained closed by a vent plug 43. Air chamber 38 collects entrained air that may be released from the water as the velocity of the water is reduced within fitting 31 ahead of the flow-limiting orifice 35. Vent plug 43 may be released periodically to open vent 42 and bleed off any air collected in air chamber 38.

The lower portion of the cross-shaped fitting 31 affords an internal sediment trap 44, located below the inlet end of orifice 35. Trap 44 collects solid particles that may be screened out by the porous barrier 37 and any other solid particulate material that may settle from the water flowing into fitting 31 at inlet 32 and out through orifice 35. The bottom of the sediment chamber or trap 44 is normally maintained closed by a trap plug 45 that is threaded into an opening in the bottom of fitting 31. Plug 45 serves to support screen 37 inside the central chamber of fitting 31 as well as providing a means for cleaning out any sediment collected in trap 44. Upon removal of plug 45, a rod or other cleaning member can be extended upwardly through the trap to clean out the orifice. The trap plug 45 may be provided with an appropriate sealing gasket 46. With plug 45 removed, of course, it is a simple matter to remove screen 37, thereby facilitating convenient and rapid cleaning of the complete fitting.

For installation of the flow resistance equalizers, such as equalizer 24, in a water circulation system such as the system 10 of FIG. 1, in a new system, the flow resistance characteristics of the individual hot water utilization units 14–17 are first established. This is ordinarily a relatively simple matter for new equipment; the manufacturers of many hot water and chilled water utilization units can supply the necessary information on request. In rare instances, with new equipment, it may be necessary to test some utilization units to determine actual flow resistances.

Once the flow resistances for the utilization units are known, a flow resistance value for uniform use in the system can be selected. With a uniform flow resistance established, and with the operating pressure range for the water circulation system known, the individual orifice sizes necessary to adjust each equalization unit to the required uniform flow resistance can be readily selected. If the utilization unit 16, for example, has a low volume requirement and a low inherent resistance, a very small limiting orifice may be necessary in equalization device 26. On the other hand, if the utilization unit 14 requires a substantial volume of water but has a relatively high inherent resistance, the orifice size selected for flow equalization device 24 may be relatively large. In each of the equalization devices 24–27, the construction is uniform except for the removable plug that constitutes the actual orifice member for the device. Consequently, the manufacturing cost for the devices is held to a minimum. Moreover, the uniform construction is of substantial value in minimizing installation costs.

FIGS. 3 and 4 illustrate a modification of the device 24 illustrated in FIG. 2, intended to facilitate cleaning of the orifice in the device. As shown in FIG. 3, the orifice plug 34A is substituted for the orifice member 34 of FIG. 2. Orifice member 34A has an inclined orifice 55, which may be oriented downwardly toward the sediment trap in the fitting to facilitate cleaning of the orifice when the trap plug is removed. The outer end of orifice 55 may be asymmetrically oriented in orifice member 34A to allow effective orientation of the orifice member with the orifice directed downwardly toward the sediment trap. Alternatively, when the orifice outlet is axially located, as in FIGS. 3 and 4, an appropriate indicator 51 may be cast into or otherwise applied to the external surface or orifice member 34A to indicate its orientation.

We claim:

1. In a liquid circulation system of the kind comprising a plurality of liquid utilization units individually connected between a supply line and a return line and having flow resistance characteristics that vary substantially from one utilization unit to another, a flow resistance equalization device comprising:

a fitting having an inlet and an outlet adapted for connection between one of said lines and an individual liquid utilization unit;

a replaceable orifice member, removably mounted in the outlet of said fitting, interposing an orifice having a limiting flow resistance in series with said liquid utilization unit;

a porous barrier, mounted within said fitting between the inlet and said orifice member, for screening out solid particles entrained in liquid flowing through said fitting to prevent clogging of the orifice;

an air chamber, within said fitting ahead of said orifice, for collecting entrained air released from the liquid as the liquid velocity is reduced ahead of said orifice; and vent means for venting said air chamber.

2. A flow resistance equalization device according to claim 1, and further comprising a sediment trap within said fitting, below said orifice between said inlet and said orifice, for collecting solid particles tending to settle out from the liquid ahead of said orifice.

3. A flow resistance equalization device according to claim 2, in which said orifice is inclined at an acute angle, toward said trap, to facilitate cleaning of the orifice.

4. A flow resistance equalization device according to claim 3, in which said orifice member bears an indicator to indicate the orientation of the orifice relative to said trap.

5. A flow resistance equalization device according to claim 2 in which said porous barrier is a metal screen removably mounted in the interior of said fitting.

6. A flow resistance equalization device according to claim 2, in which said trap includes a clean-out opening normally closed by a clean-out plug, and in which said porous barrier is removable through said clean-out opening.

7. A liquid circulation system comprising:
a liquid supply, including a pump, having an outlet connected to a supply line and an inlet connected to a return line;
a plurality of liquid utilization devices, each having an inlet port connected to said supply line and an outlet port connected to said return line, having different flow resistance characteristics;
and a corresponding plurality of flow resistance equalization devices, each interposed between a given port and the associated line for one of said utilization devices,
each said equalization device comprising a fitting having an inlet and an outlet, a replaceable orifice member removably mounted in the outlet of said fitting and interposing a limiting flow resistance in series with the associated utilization device, a porous barrier mounted within the fitting between the fitting inlet and said orifice member to screen out solid particles entrained in the liquid, and a vented air chamber within the fitting, ahead of said orifice, for collecting entrained air released from the liquid,
said replaceable orifices being selected to afford approximately equal flow resistances at each of said utilization devices to afford balanced flow in the system.

* * * * *